(12) United States Patent
Yamada

(10) Patent No.: US 7,896,554 B2
(45) Date of Patent: Mar. 1, 2011

(54) PROPELLER SHAFT FOR MOTOR VEHICLE

(75) Inventor: Toru Yamada, Tochigi (JP)

(73) Assignee: Showa Corporation, Gyoda-shi (JP)

( * ) Notice: Subject to any disclaimer, the term of this patent is extended or adjusted under 35 U.S.C. 154(b) by 686 days.

(21) Appl. No.: 11/947,828

(22) Filed: Nov. 30, 2007

(65) Prior Publication Data

US 2008/0267549 A1  Oct. 30, 2008

(30) Foreign Application Priority Data

Apr. 25, 2007  (JP) ............................. 2007-116186

(51) Int. Cl.
*F16C 27/00*  (2006.01)
*B60K 17/24*  (2006.01)
(52) U.S. Cl. ...................... 384/536; 180/381
(58) Field of Classification Search ................ 384/535, 384/536, 581, 582, 611, 612, 620; 180/381; 277/349, 351, 412, 423, 429, 571, 572
See application file for complete search history.

(56) References Cited

U.S. PATENT DOCUMENTS

| | | | | |
|---|---|---|---|---|
| 3,114,558 | A * | 12/1963 | Rhoads et al. | ............... 277/571 |
| 6,276,837 | B1 * | 8/2001 | Iwano | ......................... 384/536 |
| 6,422,947 | B1 * | 7/2002 | Kelly et al. | .................. 464/182 |
| 6,565,095 | B2 * | 5/2003 | Meacham | .................... 277/408 |
| 6,913,105 | B2 * | 7/2005 | Masuda et al. | .............. 180/381 |
| 7,611,288 | B2 * | 11/2009 | Lew | ............................. 384/536 |
| 2002/0081050 | A1 * | 6/2002 | Cermak | ....................... 384/536 |

FOREIGN PATENT DOCUMENTS

JP  2006-151056  6/2006

* cited by examiner

*Primary Examiner*—James Pilkington
(74) *Attorney, Agent, or Firm*—Babcock IP, PLLC

(57) ABSTRACT

In a propeller shaft for a motor vehicle, a cover is provided in an outer end of an annular support member, the cover extends to an inner side in a radial direction from an outer end of the annular support member, and the extended end sets a gap formed with respect to an outer shell of a stopper means so as to be open in an axial direction to an inlet of a labyrinth seal.

4 Claims, 5 Drawing Sheets

PROPELLER SHAFT FOR MOTOR VEHICLE

BACKGROUND OF THE INVENTION

1. Field of the Invention

The present invention relates to a propeller shaft for a motor vehicle.

2. Description of the Related Art

As a propeller shaft for a motor vehicle, there has been a structure described in Japanese Patent Application Laid-open No. 2006-151056 (patent document 1). As shown in FIG. 5, the propeller shaft for the motor vehicle fits a shaft-like inner 3 of the constant velocity joint 1C provided in the other split shaft 1B to a tubular outer 2 of the constant velocity joint 1C provided in one split shaft 1A. A bearing 4 is loaded onto a shaft of the inner 3 to an inner periphery of an annular support member 5. The bearing 4 is positioned by stopper means 6 and 7 (the stopper means 7 is integrally formed in the inner 3) provided in the front side and the back side in an axial direction sandwiching the bearing 4 on the shaft of the inner 3, when coupling a plurality of split shafts 1A and 1B by a constant velocity joint 1C. Seal members 8 and 9 provided beside the front side and the back side of an inner periphery supporting the bearing 4 in an inner periphery of the annular support member 5 come into slidable contact with a small diameter portion in an outer periphery of the stopper means 6 and 7. Further, outer ends 5A and 5B extending to outer sides of the front side and the back side in an axial direction of the annular support member 5 come into close contact with a large diameter portion in the outer periphery of the stopper means 6 and 7 in the front side and the back side, and a gap with respect to the large diameter portion of the outer periphery is set to labyrinth seals La and Lb, whereby a muddy water or the like is prevented from making an intrusion into a side of the beating 4 from the gap.

In patent document 1, the gap formed between the outer ends 5A and 5B of the annular support member 5 and the large diameter portion in the outer periphery of the stopper means 6 and 7 is open to an outer side in a radical direction, and the gap open to the outer side is set to an inlet of the labyrinth seals La and Lb. Accordingly, the muddy water scattered from an outer side tends to directly enter into the labyrinth seals La and Lb while keeping a high pressure. The high-pressure muddy water is exposed to a centrifugal force generated by a rotation of the inner 3 so as to travel to a further inner side along the inner periphery of the annular support member 5, and reaches the seal members 8 and 9. The muddy water reaching the seal members 8 and 9 is reserved without being discharged, and there is a risk that an abnormal noise is generated.

SUMMARY OF THE INVENTION

An object of the present invention is to reduce a muddy water intrusion to an inner portion of an annular support member supporting a shaft-like inner, and to prevent an abnormal noise from being generated as well as intending to improve a sealing performance, in a propeller shaft for a motor vehicle.

The present invention relates to a propeller shaft for a motor vehicle comprising: the propeller shaft coupling a plurality of split shafts by joints, fitting a shaft-like inner of the joint provided in the other split shaft to a tubular outer of the joint provided in one split shaft, supporting a bearing loaded onto a shaft of the inner to an inner periphery of an annular support member, and positioning the bearing by stopper means provided in the front side and the back side in an axial direction sandwiching the bearing on the shaft of the inner; a seal member provided near a side of an inner periphery supporting the bearing in an inner periphery of the annular support member, the seal member coming into slidable contact with an outer periphery of the stopper means; and an outer end extending to an outer side in the axial direction of the annular support member, the outer end coming close to an outer shell of the stopper means, and a gap with respect to the outer shell being set to a labyrinth seal. A cover is provided in an outer end of the annular support member, the cover extends to an inner side in a radial direction from an outer end of the annular support member, and the extended end sets a gap which is formed with respect to the outer shell of the stopper means so as to be open to an outer side in the axial direction, to an inlet of the labyrinth seal.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

Figure 1:
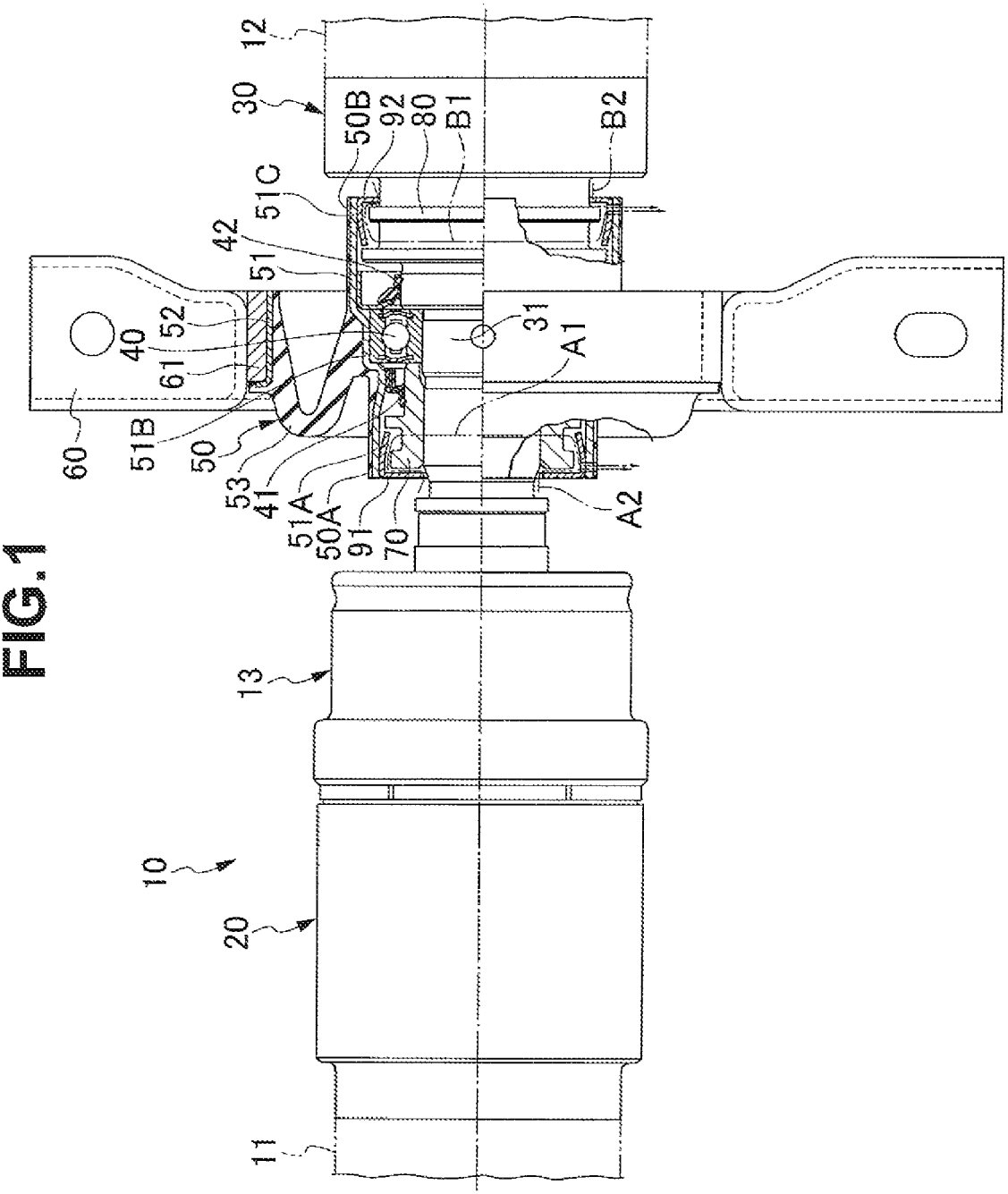
FIG. 1 is a cross-sectional view showing a propeller shaft for a motor vehicle.

A propeller shaft 10 for a motor vehicle (a front engine rear wheel drive vehicle or a four wheel drive vehicle) is constituted by two shaft members divided into a front side split shaft 11 and a rear side split shaft 12, and is structured by coupling both the split shafts 11 and 12 by a constant velocity joint (a slidable joint) 13, as shown in FIG. 1. A front end portion of the front side split shaft 11 is coupled to a connecting yoke connected to an output shaft of a transmission in an engine side via a universal joint, and a rear end portion of the rear side split shaft 12 is coupled to a connecting yoke connected to a differential gear via a universal joint.

The propeller shaft 10 connects a tubular outer 20 of the constant velocity joint 13 to one end of a hollow pipe constructing one split shaft 11 in accordance with a friction welding. Further, the propeller shaft 10 connects a shaft-like inner 30 of the constant velocity joint 13 to one end of the other split shaft 12. The inner 30 is fitted to the outer 20. An inner structure of the constant velocity joint 13 is not described in detail.

The propeller shaft 10 rotatably supports a bearing 40 loaded on a shaft of an inner shaft 31 constructing the inner 30 to an inner periphery of an annular support member 50, and is provided with the annular support member 50 in a mounting portion (an outer ring) 61 of a support base 60 fixed to a vehicle body side.

Figure 2:
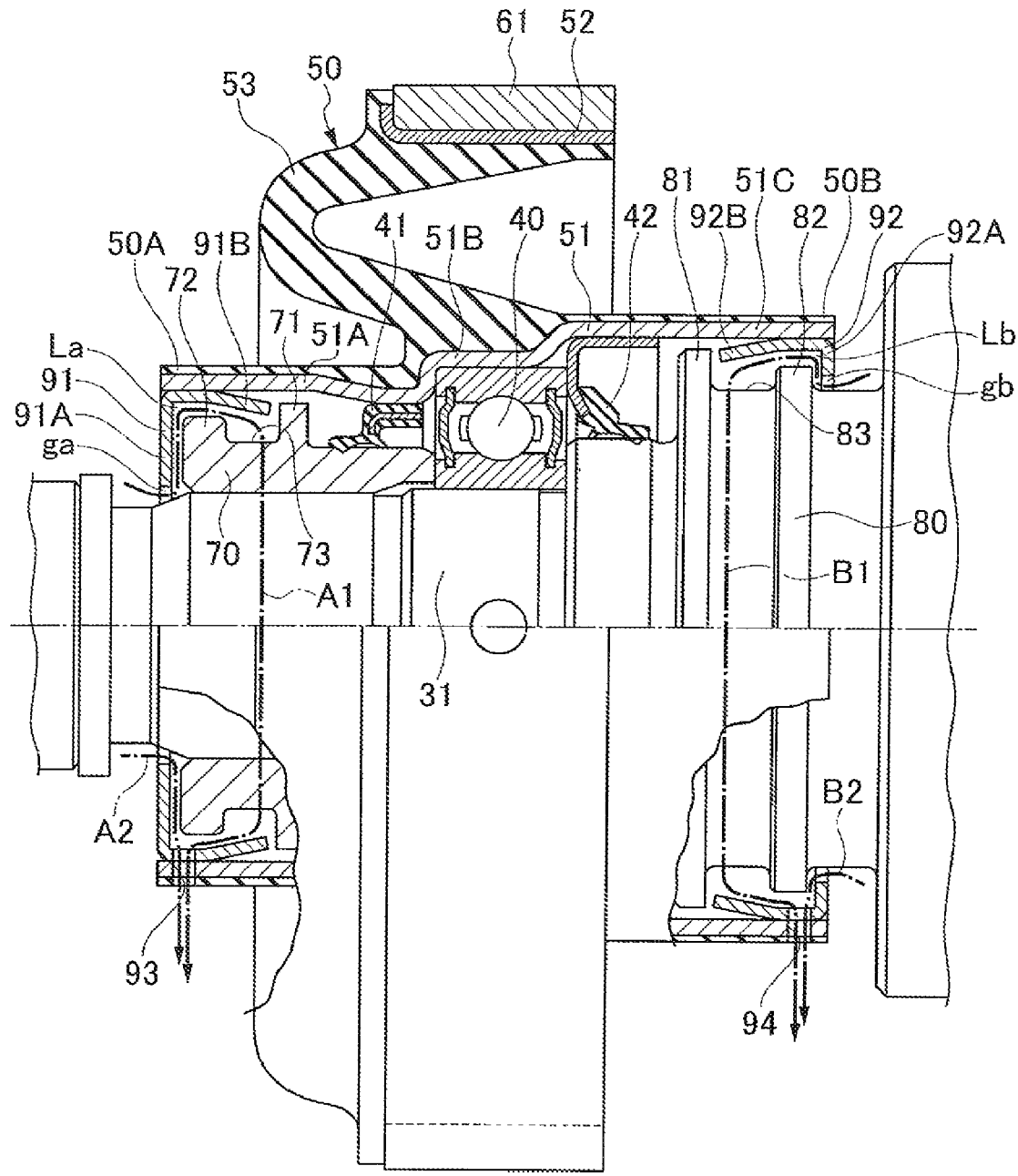
FIG. 2 is an enlarged cross-sectional view of a main portion in FIG. 1.

The annular support member 50 has an inner ring 51 supporting the bearing 40 in a fitting manner, an outer ring 52 press fitted to the mounting portion 61 of the support base 60, and a rubber-like elastic member 53 formed in such a manner as to cover an outer periphery of the inner ring 51 and an inner periphery of the outer ring 52, as shown in FIG. 2. The inner ring 51 is formed in a stepped cylindrical shape in which a diameter is changed such as a small-diameter portion 51A, a medium-diameter portion 51B and a large-diameter portion 51C between front and rear outer ends 50A and 50B mentioned below of the annular support member 50, an outer ring of the bearing 40 is fitted to an inner periphery of the medium-diameter portion 51B, the small-diameter portion 51A extends to an outer shell of a front side stopper means 70 mentioned below, and the large-diameter portion 51C extends to an outer shell of a rear stopper means 80 mentioned below.

The propeller shaft 10 loads the bearing 40 fitted to the medium-diameter portion 51B of the inner ring 51 of the annular support member 50 to the inner shaft 31 of the inner 30, and positions the beating 40 by the front and rear stopper means 70 and 80 provided in the front side and the back side in an axial direction sandwiching the bearing 40 on an axis of the inner shaft 31. In the present embodiment, the front stopper means 70 is constituted by an annular stopper piece press fitted to the inner shaft 31, and the rear stopper means 80 is structured in accordance with an integral molding. Accordingly, the inner ring of the bearing 40 is sandwiched by an end surface of the front stopper means 70 and a step surface of the rear stopper means 80 so as to be positioned.

The propeller shaft 10 loads the seal members 41 and 42 to respective inner peripheries of the small-diameter portion 51A and the large-diameter portion 51C near the front side and the back side of the medium-diameter portion 51B supporting the bearing 40, in the inner periphery of the annular support member 50. The seal member 41 comes into slidable contact with the outer periphery of the front stopper means 70, the seal member 42 comes into slidable contact with the outer periphery of the rear stopper means 80, and the bearing 40 is sealed from the front side and the back side by the seal member 41 and the seal member 42.

The propeller shaft 10 is provided with an inner flange portion 71 and an outer flange portion 72 at two inner and outer positions existing in an outer side in an axial direction from an outer periphery with which the seal member 41 comes into slidable contact, in the outer periphery of the front stopper means 70, and is provided with an annular groove 73 between the inner flange portion 71 and the outer flange portion 72. Furthermore, the propeller shaft 10 is provided with an inner flange portion 81 and an outer flange portion 82 at two inner and outer positions existing in an outer side in an axial direction from an outer periphery with which the seal member 42 comes into slidable contact, in the outer periphery of the rear stopper means 80, and is provided with an annular groove 83 between the inner flange portion 81 and the outer flange portion 82.

The propeller shaft 10 is structured such that the front outer end 50A extending to an outer side in a front side in an axial direction of the annular support member 50 comes close to an outer shell including the inner flange portion 71 and the outer flange portion 72 of the front stopper means 70, and a gap with respect to the outer shell is set to a labyrinth seal La. Further, the rear outer end 50B extending to an outer side in a rear side in the axial direction of the annular support member 50 comes close to an outer shell including the inner flange portion 81 and the outer flange portion 82 of the rear stopper means 80, and a gap with respect to the outer shell is set to a labyrinth seal Lb. The labyrinth seals La and Lb form a narrow bent path by the gaps mentioned above between an outer space of the annular support member 50 and an inner space of the bearing 40 side, and forms a resistance for preventing a muddy water or the like scattered from an outer side during vehicle movement from directly making an intrusion into the inner portion of the annular support member 50. The muddy water making an intrusion into the inner portion of the annular support member 50 after passing through the labyrinth seals La and Lb is exposed to a centrifugal force generated by a rotation of the inner shaft 31 so as to travel to an inner side along the inner periphery of the annular support member 50; that is, the small-diameter portion 51A and the large-diameter portion 51C of the inner ring 51 in the present embodiment. And the muddy water is picked up by an annular groove 73 between the inner flange portion 71 and the outer flange portion 72, or an annular groove 83 between the inner flange portion 81 and the outer flange portion 82 so as to come down to a lower side while being guided, and an intrusion to the seal members 41 and 42 side is inhibited.

Accordingly, the propeller shaft 10 is provided with the following structure for reducing an intruding amount of the muddy water or the like into the inner portion of the annular support member 50 supporting the inner 30.

Figure 3:
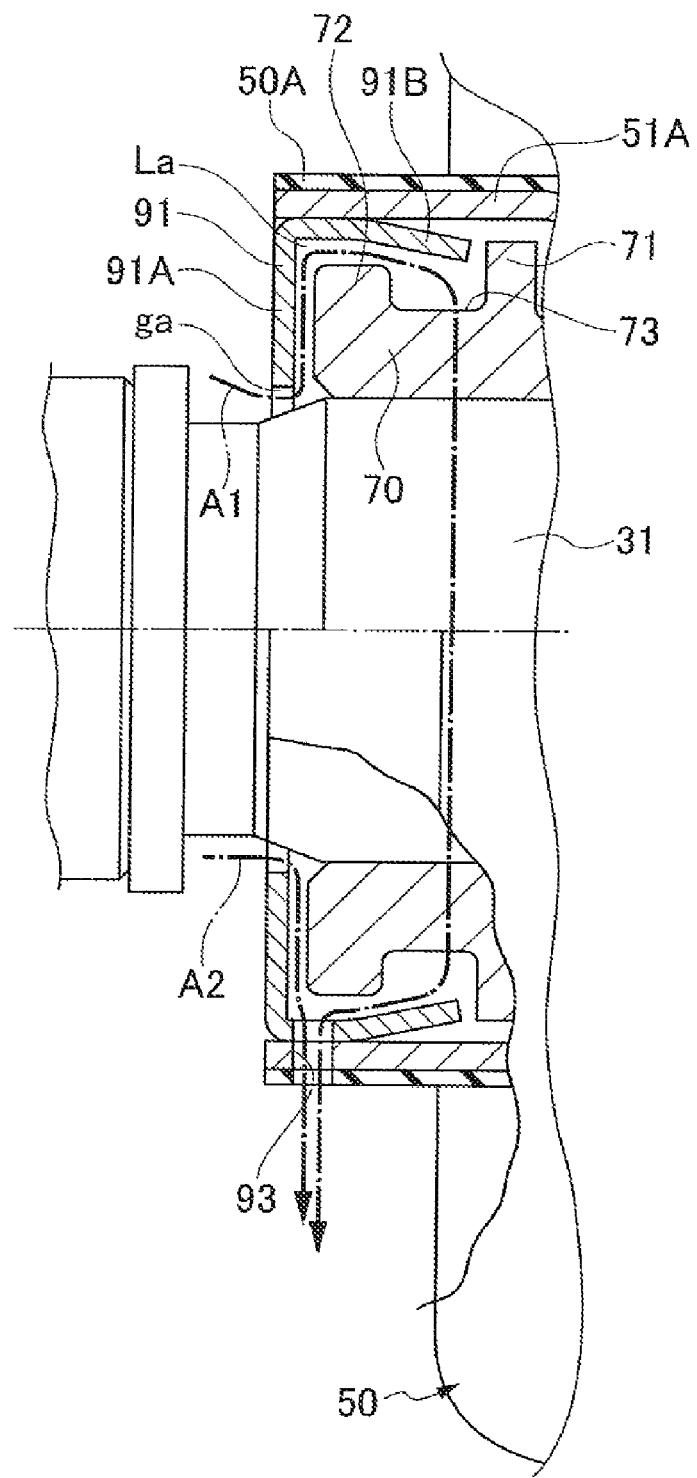
FIG. 3 is an enlarged cross-sectional view of a front portion of an annular support member.
Figure 4:
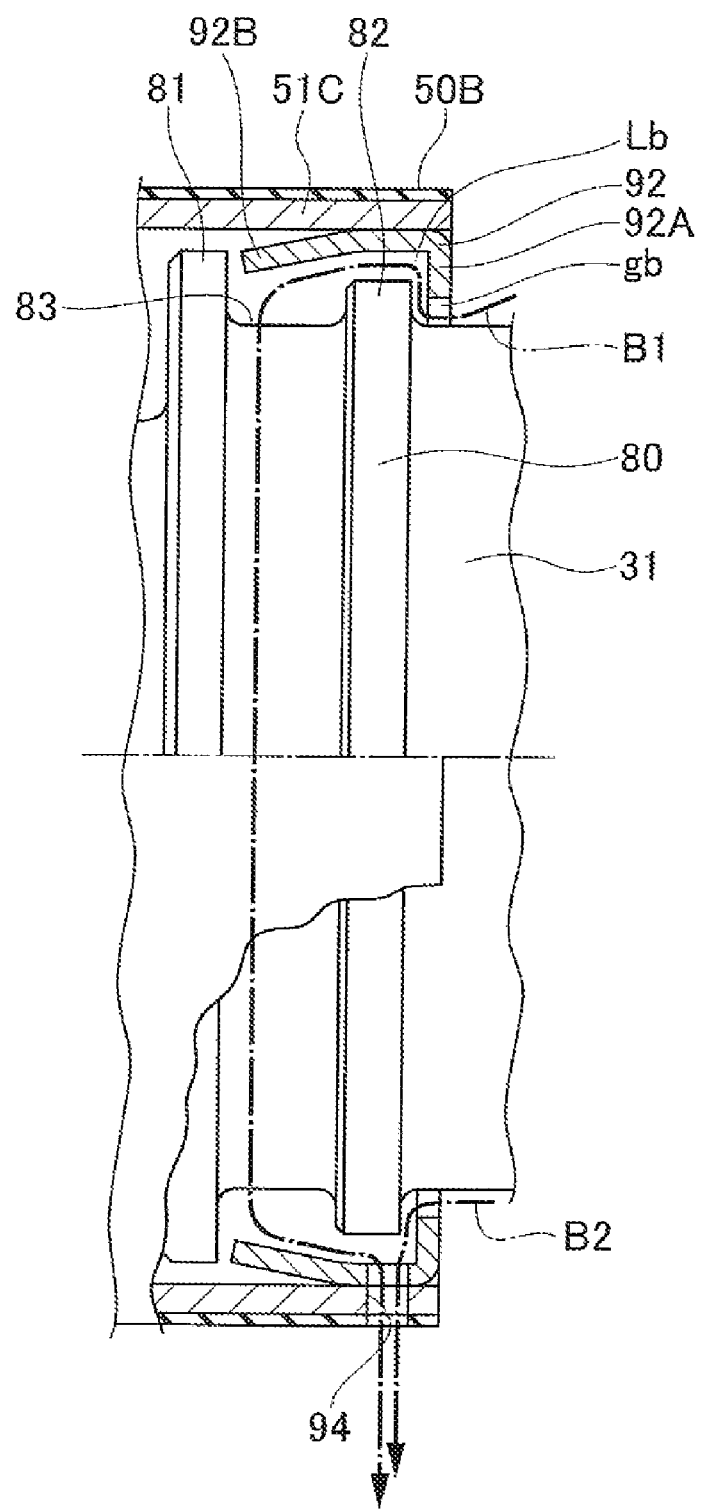
FIG. 4 is an enlarged cross-sectional view of a rear portion of the annular support member.
Figure 5:
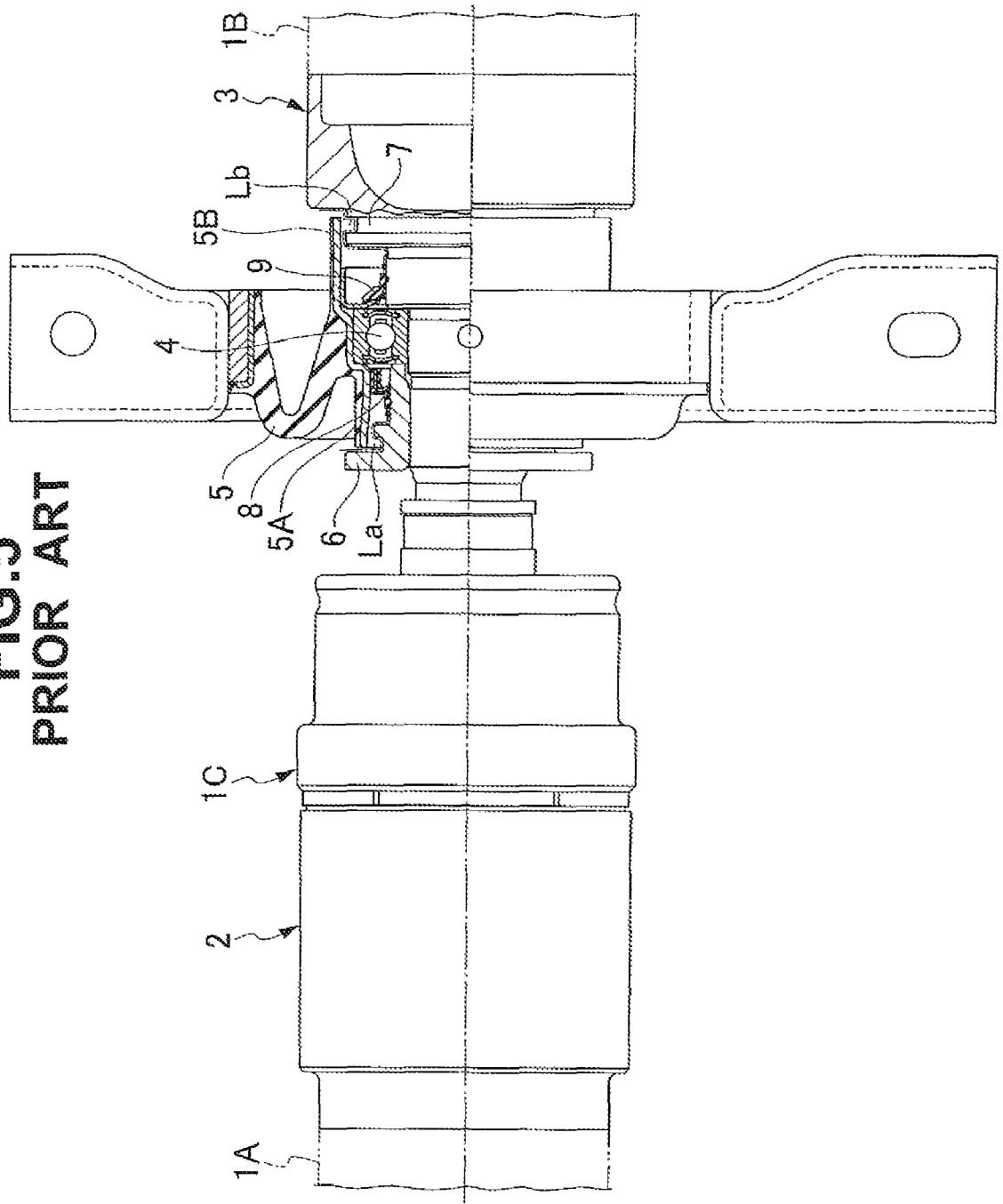
FIG. 5 is a cross-sectional view showing a prior art.

Covers 91 and 92 are provided respectively in the front and rear outer ends 50A and 50B of the annular support member 50. The cover 91 extends to an inner side in a radial direction from the front outer end 50A of the annular support member 50, as shown in FIG. 3, and a gap which is formed between the extended end and the outer shell of the front stopper means 70 and is open to an outer side in the axial direction (a gap ga formed between a shielding plate portion 91A mentioned below of the cover 91 and the outer end surface of the outer flange portion 72 in the present embodiment) is set to an inlet of the labyrinth seal La. The cover 92 extends to an inner side in a radial direction from the rear outer end 50B of the annular support member 50, as shown in FIG. 4, and a gap which is formed between the extended end and the outer shell of the rear stopper means 80 and is open to an outer side in the axial direction (a gap gb formed between a shielding plate portion 92A mentioned below of the cover 92 and the outer end surface of the outer flange portion 82 in the present embodiment) is set to an inlet of the labyrinth seal Lb.

In the present embodiment, the cover 91 is formed as an independent member from the annular support member 50, is constituted by a tubular body with shielding plate fixed by being press fitted to the inner periphery of the small-diameter portion 51A in such a manner as to extend to the inner periphery of the small-diameter portion 51A from the front outer end 50A of the annular support member 50, and has a shielding plate portion 91A and a tubular portion 91B. The shielding plate portion 91A extends to an inner side in a radial direction from the side of the front outer end 50A of the annular support member 50 so as to be formed as an annular shape opposing to the outer end surface of the outer flange portion 72 of the front stopper means 70, and a gap which is formed between the extended end and the outer end surface of the outer flange portion 72 and is open to the outer side in the axial direction is set to an inlet of the labyrinth seal La. The tubular portion 91B rises up in an axial direction from the outer peripheral end of the shielding plate portion 91A, and extends to a position (a position corresponding to a groove width of the annular groove 73) facing to the annular groove 73 between the inner flange portion 71 and the outer flange portion 72 via a portion around the outer periphery of the outer flange portion 72 of the front stopper means 70.

The tubular portion 91B of the cover 91 is reduced in diameter little by little from the side of the outer peripheral end of the shielding plate portion 91A toward the axial direction, and makes an inner diameter in a leading end of the tubular portion 91B facing to the annular groove 73 between the inner flange portion 71 and the outer flange portion 72 of the front stopper means 70 equal to or less than an outer diameter of the inner flange portion 71. In this case, the structure may be made such that the tubular portion 91B of the cover 91 extends straight without being reduced in diameter little by little from the side of the outer peripheral end of the shielding plate portion 91A, and only an inner diameter of the leading end of the tubular portion 91B facing to the annular groove 73 between the inner flange portion 71 and the outer flange portion 72 of the front stopper means 70 is formed in a small diameter so as to be set equal to or less than the outer diameter of the inner flange portion 71.

The tubular portion 91B of the cover 91 is provided with a drain hole 93 communicating an inner portion of the tubular portion 91B with an external space. In other words, there is provided the drain hole 93 passing through the tubular portion 91B positioned in a lower side in a vertical direction, and the inner ring 51 and the rubber-like elastic member 53 of the annular support member 50 positioned in an outer side of the tubular portion 91B, in a used state in which the annular support member 50 fixing the cover 91 thereto is attached to the vehicle body.

Furthermore, the cover 92 is formed as an independent member from the annular support member 50, is constituted by a tubular body with shielding plate fixed by being press fitted to the inner periphery of the large-diameter portion 51C in such a manner as to extend to the inner periphery of the large-diameter portion 51C from the rear outer end 50B of the annular support member 50, and has a shielding plate portion 92A and a tubular portion 92B. The shielding plate portion 92A extends to an inner side in a radial direction from the side of the rear outer end 50B of the annular support member 50 so as to be formed as an annular shape opposing to the outer end surface of the outer flange portion 82 of the rear stopper means 80, and a gap which is formed between the extended end and the outer end surface of the outer flange portion 82 and is open to the outer side in the axial direction is set to an inlet of the labyrinth seal Lb. The tubular portion 92B rises up in an axial direction from the outer peripheral end of the shielding plate portion 92A, and extends to a position (a position corresponding to a groove width of the annular groove 83) facing to the annular groove 83 between the inner flange portion 81 and the outer flange portion 82 via a portion around the outer periphery of the outer flange portion 82 of the rear stopper means 80.

The tubular portion 92B of the cover 92 is reduced in diameter little by little from the side of the outer peripheral end of the shielding plate portion 92A toward the axial direction, and makes an inner diameter in a leading end of the tubular portion 92B facing to the annular groove 83 between the inner flange portion 81 and the outer flange portion 82 of the rear stopper means 80 equal to or less than an outer diameter of the inner flange portion 81. In this case, the structure may be made such that the tubular portion 92B of the cover 92 extends straight without being reduced in diameter little by little from the side of the outer peripheral end of the shielding plate portion 92A, and only an inner diameter of the leading end of the tubular portion 91B facing to the annular groove 83 between the inner flange portion 81 and the outer flange portion 82 of the rear stopper means 80 is formed in a small diameter so as to be set equal to or less than the outer diameter of the inner flange portion 81.

The tubular portion 92B of the cover 92 is provided with a drain hole 94 communicating an inner portion of the tubular portion 92B with an external space. In other words, there is provided the drain hole 94 passing through the tubular portion 92B positioned in a lower side in a vertical direction, and the inner ring 51 and the rubber-like elastic member 53 of the annular support member 50 positioned in an outer side of the tubular portion 92B, in a used state in which the annular support member 50 fixing the cover 92 thereto is attached to the vehicle body.

Accordingly, in the propeller shaft 10, the following operations and effects can be achieved by forming the cover 91 in the front, outer end 50A of the annular support member 50. In this case, in FIGS. 2 and 3, reference symbols A1 and A2 denote an intrusion drain path of the muddy water or the like in a side of the front outer end 50A of the annular support member 50.

(a) The cover 91 provided in the front outer end 50A of the annular support member 50 opens the gap formed with respect to the outer periphery of the front stopper means 70 provided in the shaft-like inner 30 to the outer side in the axial direction, and the gap open to the outer side is set to the inlet of the labyrinth seal La. Accordingly, the muddy water scattered from the outer side is changed in direction without directly entering into the labyrinth seal La, thereby entering into the labyrinth seal La after being set to the low pressure. As a result, it is possible to reduce the direct intruding amount of the muddy water or the like to the side of the seal member 41 in the inner portion of the annular support member 50, and it is possible to suppress a lowering of the sealing function so as to prevent the abnormal noise from being generated.

(b) The cover 91 is provided in such a manner as to extend to the inner periphery from the front outer end 50A of the annular support member 50, and is provided with the tubular portion 91B extending to the position facing to the annular groove 73 between the outer flange portion 72 and the inner flange portion 71 in the front stopper means 70, in addition to the shielding plate portion 91A opening the gap with respect to the outer periphery of the front stopper means 70 forming the inlet of the labyrinth seal La to the outer side in the axial direction. Accordingly, it is possible to guide and introduce the flow winch is exposed to the centrifugal force generated together with the rotation of the shaft-like inner 30 so as to travel to the further inner side along the inner portion of the annular support member 50, after making an intrusion into the labyrinth seal La to the annular groove 73 between the outer flange portion 72 and the inner flange portion 71 by the tubular portion 91B, thereby preventing the flow from traveling to the side of the seal member 41.

(c) The tubular portion 91B of the cover 91 makes the inner diameter of the leading end facing to the annular groove 73 between the outer flange portion 72 and the inner flange portion 71 of the front stopper means 70 equal to or less than the outer diameter of the inner flange portion 71. Accordingly, the muddy water which is exposed to the centrifugal force generated together with the rotation of the shaft-like inner 30 so as to travel to the further inner side along the inner portion of the annular support member 50, after making an intrusion into the labyrinth seal La in the item (b) mentioned above is introduced to the annular groove 73 between the outer flange portion 72 and the inner flange portion 71 so as to securely fall down, without getting over the outer periphery of the inner flange portion 71 so as to move to the side of the seal member 41, after passing through the leading end of the tubular portion 91B.

(d) Since the tubular portion 91B of the cover 91 is reduced in diameter little by little toward the axial direction, the flow which is exposed to the centrifugal force generated together with the rotation of the shaft-like inner 30 so as to travel to the further inner side along the inner portion of the annular support member 50, after making an intrusion into the labyrinth seal La in the item (b) mentioned above is smoothly introduced to the annular groove 73 between the outer flange portion 72 and the inner flange portion 71 so as to securely fall down.

(e) The tubular portion 91B of the cover 91 is provided with the drain hole 93 communicating the inner portion of the tubular portion 91B with the external space. Accordingly, the flow which is exposed to the centrifugal force generated together with the rotation of the shaft-like inner 30 so as to travel to the further inner side along the inner portion of the annular support member 50, after making an intrusion into the labyrinth seal La is discharged to the external portion through the cover 91 in the lower side of the annular groove 73, the inner ring 51 of the annular support member 50 and the drain hole 93 provided in the rubber-like elastic member 53, for example, after being picked up by the annular groove 73 between the outer flange portion 72 and the inner flange portion 71 so as to fall down.

Furthermore, the following operations and effects can be achieved by forming the cover 92 in the rear outer end 50B of the annular support member 50. In this case, in FIGS. 2 and 4, reference symbols B1 and B2 denote an intrusion drain path of the muddy water or the like in a side of the rear outer end 50B of the annular support, member 50.

(a) The cover 92 provided in the rear outer end 50B of the annular support member 50 opens the gap formed with respect to the outer periphery of the rear stopper means 80 provided in the shaft-like inner 30 to the outer side in the axial direction, and the gap open to the outer side is set to the inlet of the labyrinth seal Lb. Accordingly, the muddy water scattered from the outer side is changed in direction without directly entering into the labyrinth seal Lb, thereby entering into the labyrinth seal La after being set to the low pressure. As a result, it is possible to reduce the direct intruding amount of the muddy water or the like to the side of the seal member 42 in the inner portion of the annular support member 50, and it is possible to suppress a lowering of the sealing function so as to prevent the abnormal noise from being generated.

(b) The cover 92 is provided in such a maimer as to extend to the inner periphery from the rear outer end 50B of the annular support member 50, and is provided with the tubular portion 92B extending to the position facing to the annular groove 83 between the outer flange portion 82 and the inner flange portion 81 in the rear stopper means 80, in addition to the shielding plate portion 92A opening the gap with respect to the outer periphery of the rear stopper means 80 forming the inlet of the labyrinth seal Lb to the outer side in the axial direction. Accordingly, it is possible to guide and introduce the flow which is exposed to the centrifugal force generated together with the rotation of the shaft-like inner 30 so as to travel to the further inner side along the inner portion of the annular support member 50, after making an intrusion into the labyrinth seal Lb to the annular groove 83 between the outer flange portion 82 and the inner flange portion 81 by the tubular portion 92B, thereby preventing the flow from traveling to the side of the seal member 42.

(c) The tubular portion 92B of the cover 92 makes the inner diameter of the leading end facing to the annular groove 83 between the outer flange portion 82 and the inner flange portion 81 of the rear stopper means 80 equal to or less than the outer diameter of the inner flange portion 81. Accordingly, the muddy wafer which is exposed to the centrifugal force generated together with the rotation of the shaft-like inner 30 so as to travel to the further inner side along the inner portion of the annular support member 50, after making an intrusion into the labyrinth seal Lb in the item (b) mentioned above is introduced to the annular groove 83 between the outer flange portion 82 and the inner flange portion 81 so as to securely fall down, without getting over the outer periphery of the inner flange portion 81 so as to move to the side of the seal member 42, after passing through the leading end of the tubular portion 92B.

(d) Since the tubular portion 92B of the cover 92 is reduced in diameter little by little toward the axial direction, the flow which is exposed to the centrifugal force generated together with the rotation of the shaft-like inner 30 so as to travel to the further inner side along the inner portion of the annular support member 50, after making an intrusion into the labyrinth seal Lb in the item (b) mentioned above is smoothly introduced to the annular groove 83 between the outer flange portion 82 and the inner flange portion 81 so as to securely fall down.

(e) The tubular portion 92B of the cover 92 is provided with the drain hole 94 communicating the inner portion of the tubular portion 92B with the external space. Accordingly, the flow which is exposed to the centrifugal force generated together with the rotation of the shaft-like inner 30 so as to travel to the further inner side along the inner portion of the annular support member 50, after making an intrusion into the labyrinth, seal Lb is discharged to the external portion through the cover 92 in the lower side of the annular groove 83, the inner ring 51 of the annular support member 50 and the drain hole 94 provided in the rubberlike elastic member 53, for example, after being picked up by the annular groove 83 between the outer flange portion 82 and the inner flange portion 81 so as to fall down.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A propeller shaft for a motor vehicle comprising:
a plurality of split shafts coupled by a joint, an inner shaft of the joint provided in one split shaft and a tubular outer of the joint provided in the other split shaft, a bearing positioned on the inner shaft and supported by an inner periphery of an annular support member, the bearing being positioned between a front stopper means and a rear stopper means in an axial direction sandwiching the bearing on the inner shaft;
the front stopper means and the rear stopper means each have an outer periphery having an inner flange portion, an outer flange portion and an annular groove between the inner flange portion and the outer flange portion, the inner flange portion of each stopper means is positioned closer to the bearing than the outer flange portion of each stopper means in the axial direction;
a first seal member and a second seal member positioned within the inner periphery of the annular support member, the first seal member and the second seal member coming into slidable contact with an outer periphery of the front stopper means and the rear stopper means, respectively; the first seal member and the second seal member are positioned between the inner flange portion of the respective stopper means and the bearing;

the annular support member having an outer end extending in the axial direction, the outer end surrounding the outer periphery of one of the front stopper means or rear stopper means, and a gap is formed between the outer periphery of the stopper means and the outer end of the annular support member, the gap forms a labyrinth seal;

a cover provided at the outer end of the annular support member, the cover comprising:

an extended end that extends to an inner side in a radial direction from the outer end of the annular support member, the extended end forms an annular shape shielding plate portion opposing an outer end surface of the outer flange creating a gap with the outer end surface of the outer flange of the stopper means to form an inlet of the labyrinth seal;

and a tubular portion extending from an outer periphery of the extended end to a position facing the annular groove between the outer flange portion and the inner flange portion of the stopper means;

the tubular portion of the cover is provided with an inner diameter at a leading end face that faces the annular groove between the outer flange portion and the inner flange portion of the stopper means that is equal to or less than an outer diameter of the inner flange portion of the stopper means; and the tubular portion of the cover is reduced in diameter little by little toward the axial direction from the outer periphery of the extended end to the leading end face.

2. A propeller shaft for a motor vehicle according to claim 1, wherein the tubular portion of the cover is provided with a drain hole communicating an inner portion of the tubular portion with an external space.

3. A propeller shaft for a motor vehicle according to claim 1, wherein the annular support member extends to the front side and the back side in the axial direction sandwiching the bearing, and the cover is provided at outer ends of the front side and the back side of the annular support member.

4. A propeller shaft for a motor vehicle according to claim 3, wherein the annular support member has an inner ring supporting the bearing in a fitting manner, an outer ring press fitted to a mounting portion of a support base fixed to a vehicle body side, and an elastic member covering an outer periphery of the inner ring and an inner periphery of the outer ring, and wherein the inner ring is formed in a stepped cylindrical shape in which a diameter is changed from a small-diameter portion, to a medium-diameter portion and then a large-diameter portion between both outer ends of the annular support member, and an outer ring of the bearing is fitted to an inner periphery of the medium-diameter portion.

* * * * *